US006898654B1

(12) United States Patent
Senior et al.

(10) Patent No.: US 6,898,654 B1
(45) Date of Patent: May 24, 2005

(54) METHOD AND SYSTEM FOR MANAGING BANDWIDTH ON A MASTER-SLAVE BUS

(75) Inventors: Jay Senior, Redmond, WA (US); John C. Dunn, Issaquah, WA (US); Doron J. Holan, Kirkland, WA (US); Kenneth D. Ray, Redmond, WA (US); Bradley L. Carpenter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/364,220

(22) Filed: Jul. 29, 1999

(51) Int. Cl.$^7$ .............................................. G06F 13/14

(52) U.S. Cl. ..................................... 710/305

(58) Field of Search ................................. 710/305, 306, 710/311, 313, 315, 316, 317, 310, 309

(56) References Cited

U.S. PATENT DOCUMENTS

| | | | |
|---|---|---|---|
| 4,423,480 A | | 12/1983 | Bauer et al. |
| 5,687,167 A | * | 11/1997 | Bertin et al. ................. 370/254 |
| 5,701,305 A | | 12/1997 | Albrecht |
| 5,848,266 A | * | 12/1998 | Scheurich ................... 713/503 |
| 6,000,040 A | | 12/1999 | Culley et al. |
| 6,049,828 A | | 4/2000 | Dev et al. |
| 6,252,886 B1 | * | 6/2001 | Schwager et al. .......... 370/443 |
| 6,262,974 B1 | * | 7/2001 | Chevalier et al. ........... 370/232 |
| 6,279,060 B1 | | 8/2001 | Luke et al. |

OTHER PUBLICATIONS

Anderson, Don, "Overview of the IEEE 1394 Architecture." In *FireWire Systems Architecture*, 2$^{nd}$ ed. MindShare, Inc. (1998).
USB Implementers Forum Inc. *Universal Serial Bus Specification Revision 1.1*. Chapter 4, "Architectural Overview." Sep. 23, 1998.
USB Implementers Forum Inc. *Universal Serial Bus Specification Revision 1.1*. Chapter 5, "USB Data Flow Model." Sep. 23, 1998.
USB Implementers Forum Inc. *Universal Serial Bus Specification Revision 1.1*. Chapter 8, "Protocol Layer." Sep. 23, 1998.
USB Implementers Forum Inc. *Universal Serial Bus Specification Revision 1.1*. Chapter 10, "USB Host: Hardware and Software." Sep. 23, 1998.

(Continued)

*Primary Examiner*—P. Austin Bradley
*Assistant Examiner*—X. Chung-Trans
(74) *Attorney, Agent, or Firm*—Leydig, Voit & Mayer, Ltd

(57) ABSTRACT

A method for rebalancing bandwidth allocations to peripheral and other devices, particularly for isochronous communications, connected to a computer system via a bus in order to accommodate bandwidth requirements of a newly added device or newly launched application is described. The method is particularly useful in the context of buses such as the Universal Serial Bus (USB) and the IEEE 1394 bus (FireWire) which allow a plurality of devices to be connected to a computer system and even be powered by the bus. The method utilizes a Policy to identify preferred configurations and, furthermore, extends the USB and other standards to specify devices that can dynamically respond to commands to change their bandwidth to another setting.

11 Claims, 6 Drawing Sheets

OTHER PUBLICATIONS

Garney, John. "An Analysis of Throughput Characteristics of Universal Serial Bus." USB technical paper, Dec. 6, 1996.

Microsoft Corporation. "Microsoft's USB Plans." Publised at www.microsoft.com/HWDev/presents/winbec98/winhec3-4.htm. Accessed Apr. 16, 1999.

Microsoft Corporation. "Layered I/O, IRPs, and I/O Objects." Publised at www.microsoft.com/DDK/DDKdocs/win50ddk/02irps_46qv.htm. Accessed Apr. 16, 1999.

Microsoft Corporation. "WDM USB Driver Interface." Published at www.microsoft.com/HWDev/desinit/wdmusb.htm. Accessed Apr. 29, 1999.

Microsoft Corporation. "USB System Software." Published at http://msdn.microsoft.com/library/tools/wceddk/usb 6.htm. Accessed Apr. 29, 1999.

Microsoft Corporation. "WMI System Properties." Published at http://msdn.microsoft.com . . . rary/sdkdoc/wbem/hmmprop_1hrn.htm. Accessed Apr. 29, 1999.

Microsoft Corporation. "Plug and Play for Windows 2000." Published at www.microsoft.com/hwdev/desinit/pnpnt5_2.htm. Accessed Apr. 12, 1999.

Microsoft Corporation. "Handling Asynchronous Bulk Data Transfer in a USB Minidriver." Published at www.microsoft.com/hwdev/driver/usbmini.htm. Accessed Apr. 12, 1999.

USBnet™ NET-USB-USB, Instant USB Network, Product Information, "Installation is simple", retrieved from http://www.entrega.com/con usb prodinfo.html on Mar. 17, 2000, pp. 1-2.

Anderson, Don, "Firewire® System Architecture". Second Edition, IEEE 1394a. MindShare, Inc., 1998, pp. i-509.

"IEEE Standard for a High Performance Serial Bus", Microprocessor and Microcomputer Standards Committee of the IEEE Computer Society, *IEEE Std 1394-1995*, i-384.

* cited by examiner

METHOD AND SYSTEM FOR MANAGING BANDWIDTH ON A MASTER-SLAVE BUS

TECHNICAL FIELD

This invention relates generally to making adjustments in allocation of Bandwidth to peripherals communicating with a computer system via a bus, and more particularly, relates to devices using the isochronous mode of data transfer on a Universal Serial Bus (USB).

BACKGROUND

USB is a cable bus that supports data exchange between a Host computer and a plurality of peripheral devices by means of serial data packets, and interfaces for converting these data packets into a format suitable for use by a computer or device connected to the USB. The USB design permits a star topology for connecting up to 127 devices. USB comprises a plurality of devices, which include one Host, which also functions as a root hub, and additional hubs or functions. A USB hub has a number of ports that can be used for connecting devices or other hubs.

USB is not the only standard that allows for extending the reach of personal computers. Another well known standard is the FireWire, i.e., IEEE 1394 bus standard, available at http://standards.ieee.org/catalog/bus.html#1394-1995, which allows for asynchronous and isochronous packet based communications with dynamic configuration and a provision for powering devices via the bus. An IEEE 1394 compliant serial bus provides greater bandwidth (100 Mbps or more) than the USB (12 Mbps). Still, it is susceptible to exhaustion of its bandwidth capability and consequent difficulties for users as in the case of USB. The discussion below focuses on USB for illustrative purposes only and is not intended to be a limitation on the scope of the claims.

The devices connected to a USB fall into two major classes—functions and hubs, which are differentiated by the roles they play in the organization and operation of the USB system. All hubs have a plurality of downstream ports and one upstream port. These ports can be used to connect other devices, including hubs. Functions are devices that do not possess ports for connecting more devices downstream from them, but usually perform tasks. Some examples of tasks include collecting data via a video camera, driving speakers, or using a modem. A device may possess downstream ports while being able to perform tasks, but such a device is considered by the USB to comprise a hub with functions connected to the hub. Of course, all devices have to be USB compatible in order to operate satisfactorily while connected to a USB.

Another notable feature of the USB is that it not only supports data flow, but also allows for powering peripheral devices connected to the USB, although it does not require that the peripherals, i.e. devices, be powered by the USB. Thus, it is possible to have devices that have their own source of power and/or utilize USB supplied power.

USB supports data transfer at either a 'fast' or 'slow' rate thereby meaning 12 Megabits/second (Mbps) or 1.5 Mbps respectively. Both modes can be supported in the same USB due to built in dynamic switching between transfers. In addition, devices connected to the USB are detected and configured dynamically and the USB system is designed to handle a device being disconnected or connected without notice.

Hubs play a very important role in the operation of the USB. A hub includes several downstream ports, usually one upstream port, a repeater, a hub controller and a hub driver. Each hub detects the connection or disconnection of a device on any one of its ports. In addition, a hub can reset or render inactive any of its ports, and consequently the devices connected to that port. Some hubs, e.g., "ENTREGA® USBnet", may even be connected to two computers in order to facilitate communication between two computers. Further details on this device are available at www.entrega.com/con__usb__prodinfo.html. It should be noted that here the term 'hub' is used broadly to include devices, e.g., "ENTREGA® USBnet," with potentially more than one upstream connection.

One device in particular plays a unique role in the operation of the USB, i.e. the Host, which includes a root hub, and to which other devices, including other hubs, are connected. Each USB has one and only one Host. The Host configures other hubs and devices connected to them on the USB. It is also responsible for managing the signaling and data transfer on a USB. It generates a Start of Frame (SOF) signal every 1 ms regardless of other activity on the USB, which is used by downstream hubs to synchronize their clocks. The robustness of USB in data transfer is furthered by the requirement that hubs maintain synchronization with the Host even if one SOF is missed.

Data transmission on the USB is primarily of four types: control transfer, bulk transfer, interrupt transfer and isochronous transfer. These modes differ in the guarantees given to the devices requesting the connections. All data transfers are targeted to a logical endpoint on a device. A given endpoint supports a particular type of data transfer with certain guarantees that are negotiated in the course of device configuration. Furthermore, a USB device may support many endpoints.

Thus, e.g., isochronous data transfer assures data transfer at the fast rate with specified bandwidth, and without error correction, i.e. in the event of an error the system does not attempt to resend a data packet, and naturally, there is no acknowledgment of data receipt. On the other hand, interrupt transfer supports error correction, and in the event of an error, a data packet is retransmitted. Interrupt transfers also enjoy a system assurance of transmission within a given time latency with acknowledgment of uncorrupted data. Thus, isochronous data transfer is, for example, suited for a continuous feed from a camera while interrupt transfer is better suited for devices such as a mouse that need quick attention, but may remain idle for unpredictable periods of time. Bulk data transfer does not have any assurance of when it would be transmitted, but is acknowledged in the course of error detection and correction.

USB offers a flexible method of connecting a plurality of devices to a computer such that the devices can be connected and configured (or disconnected) without having to cold-start the computer while allowing for reliable data transfer at a variety of QoS levels. The benefit to the user of being able to use cameras, printers, scanners, keyboards, mice, displays and the like by merely plugging in the devices cannot be understated.

However, the USB, as presently implemented, has a number of limitations that reduce its utility. Some problems in connecting devices of interest encountered by users, despite the ability to connect as many as 127 devices to a USB, are due to the maximum bandwidth of only 12 Mbps in the fast mode. The limited bandwidth combined with bandwidth consuming devices like cameras, speakers, etc. act as another limitation on the number of devices that can be concurrently operated while connected to a USB.

When the USB detects and configures a newly connected device, it fails to allocate resources if it cannot support the device requirements. In other words, the device being plugged is enumerated and presented to the system but will not work. This limitation can be particularly vexing for users who are not computer-literate to the extent of routinely trouble-shooting problems. Such a user might get frustrated or erroneously conclude that a given device is defective. Worse, the consumer may return a perfectly functioning USB compatible device, or the computer itself not to mention use vast amounts of expensive technical support time.

USB is not sufficiently flexible to adjust its resource allocation without requiring extensive user input. In addition, the present specifications for the USB do not address the desirability of a certain set of devices working together in preference to other combinations. Furthermore, USB often favors the first device configured to run regardless of the contextual utility. For example, it may be preferable to operate speakers with a camera as opposed to a scanner, but USB will prefer a scanner already in use to a new connection sought by speakers. These limitations are particularly limiting in the case of isochronous devices.

Bus specifications, other than USB, face similar limitations in accommodating devices with combined bandwidth requirements greater than the bandwidth available on the bus. This problem is bound to worsen as more devices requiring substantial bandwidth come on the market.

The rules for operating devices that may be able to function acceptably with lower resolution, i.e. lower bandwidth, limit efficient dynamic reallocation of bandwidth. For example, USB specification, version 1.1, requires that the configuration of a device cannot be dynamically changed while data is either being transmitted or received. Since, isochronous data pipes provide continuous data throughput, with specified bandwidth, this is a significant limitation on dynamic modification of the bandwidth allocation.

SUMMARY

The invention described in the instant application overcomes these limitations and more by providing for a software module, rebalancing-enabler, which permits dynamic reallocation of bandwidth resources between devices connected to a USB, including implementation of preferences for certain configuration and decision making strategies. Some embodiments of the invention also facilitate better designs for devices designed to operate in an isochronous manner to enable dynamic bandwidth adjustments.

Such advantages are achieved using the flexibility in the USB specifications while taking advantage of the dynamic device attachment and detachment inherent in the USB design. In particular, the fact that devices that are connected to the USB but not actually carrying out any functions do not use bandwidth can be advantageously used. In addition, operating system specific changes are suggested to facilitate bandwidth resource management supplemented with a better design for devices so that devices are able to change their bandwidth requirements dynamically without significantly inconveniencing the users.

It should be understood, as would be apparent to one of ordinary skill in the art, that many embodiments of the invention are possible, which do not necessarily require changes to the operating system, and are not limited to the USB.

Additional features and advantages of the invention will be made apparent from the following detailed description of some of the many possible illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
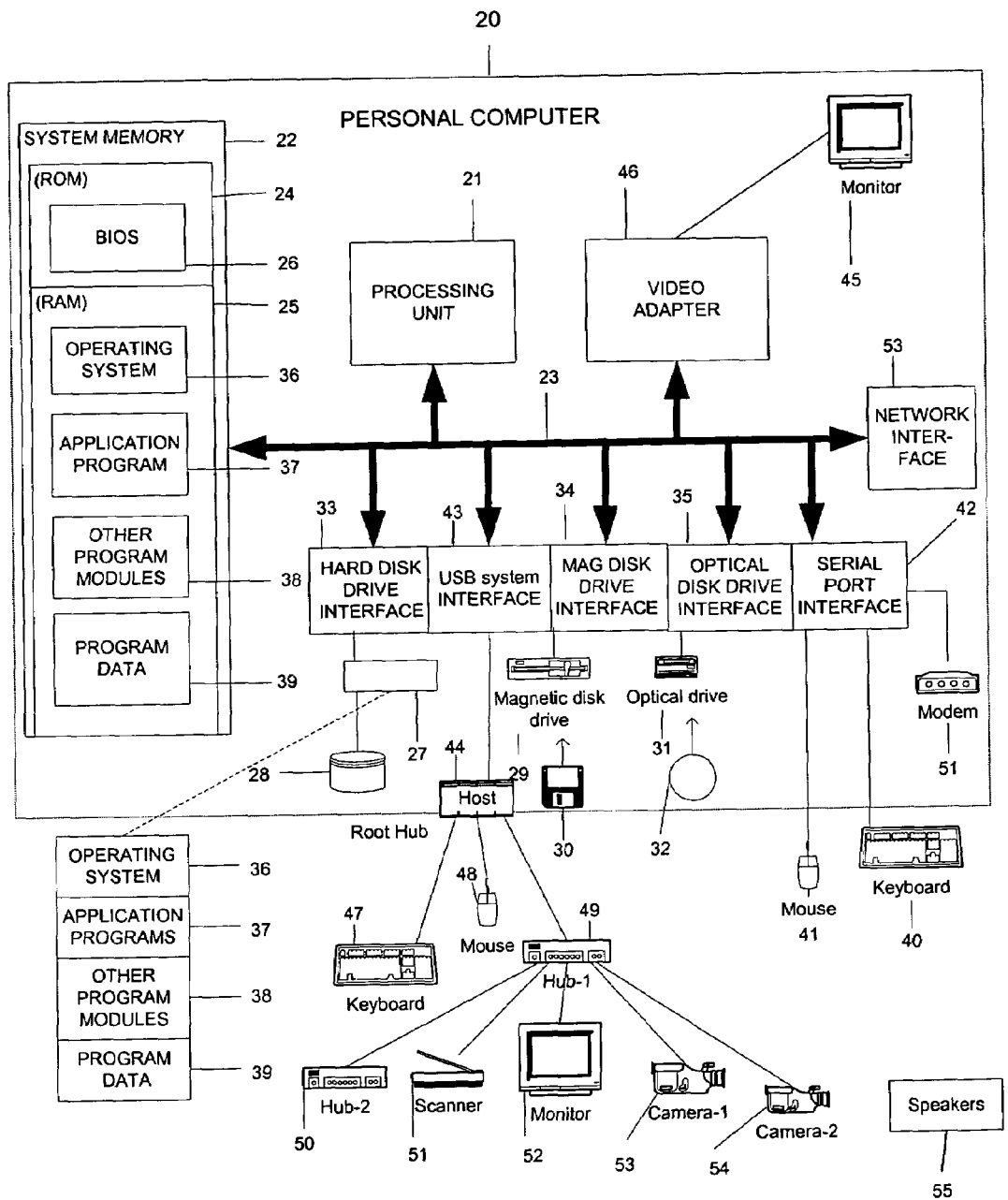
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 may further include a hard disk drive 27 for reading from and writing to a hard disk 28, a magnetic disk drive 29 for reading from or writing to a removable magnetic disk 30, and an optical disk drive 31 for reading from or writing to a removable optical disk 32 such as a CD ROM or other optical media.

The hard disk drive 27, magnetic disk drive 29, and optical disk drive 31 are connected to the system bus 23 by a hard disk drive interface 33, a magnetic disk drive interface 34, and an optical disk drive interface 35, respectively. The drives and their associated computer-readable media provide nonvolatile storage of computer readable instructions, data structures, program modules and other data for the personal computer 20. Although the exemplary environment described herein employs a hard disk 28, a removable magnetic disk 30, and a removable optical disk 32, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 28, magnetic disk 30, optical disk 32, ROM 24 or RAM 25, including an operating system 36, one or more applications programs 37, other program modules 38, and program data 39. A user may enter commands and information into the personal computer 20 through input devices such as a keyboard 40 and a pointing device 41. Other input devices (not shown) may include a microphone, joystick, game pad, satellite dish, scanner, or the like. These and other input devices are often connected to the processing unit 21 through a serial port interface 42 that is coupled to the system bus. Increasingly, such devices are being connected by the next generation of interfaces, such as a universal serial bus (USB) 43 with a root hub/Host 44, and to which other hubs and devices may be connected. Other interfaces that may be used include parallel ports, game ports, and the FireWire, i.e., the IEEE 1394 specification available at http://standards.ieee.org/catalog/bus.html#1394-1995. A monitor 45 or other type of display device is also connected to the system bus 23 via an interface, such as a video adapter 46. In addition to the monitor, personal computers typically include other peripheral output devices.

The USB connections illustrate its utility. A keyboard 47, a pointing device 48 and another hub, hub-1 49, are connected to the root hub/Host 44. Hub-1 49 is further connected to another hub, hub-2, 50, scanner 51, monitor 52, camera-1 53, and camera-2 54. Monitor 52 preferably uses USB for configuration and control rather than streaming input, although later versions may advantageously be used for streaming input to monitor 52. USB compatible speakers 55 are not connected, but may be connected if desired.

The personal computer 20 may operate in a networked environment using logical connections to one or more remote computers. The remote computer may be another personal computer, a server, a router, a network PC, a peer device or other common network node, and typically includes many or all of the elements described above relative to the personal computer 20 in FIG. 1. Such networking environments are commonplace in offices, enterprise-wide computer networks, intranets and the Internet. USB provides another way to connect to a network by either using a communication link via a modem, an ISDN connection and the like, or even a hub that can be connected to two computers, e.g., "ENTREGA® USBnet." Such hubs, however, require special software.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of ordinary skill in the art will appreciate that various of the acts and operation described hereinafter may also be implemented in hardware or more than one software module.

When a device supporting an end point for sending or receiving isochronous data is connected to a USB port the hub, to which the port is connected, detects the presence of the device. Upon being queried by the Host, the presence of the device is revealed to the Host by the hub. The Host communicates with the device using control transfer on end point 0, which every USB compatible device is required to support. As a result of these communications, the Host learns of the configuration modes supported by the device and the nature and number of endpoints it can support.

If the USB can support the requested resources, the device is configured with its parameters set and is ready from the point of view of the device. This decision may be made by the USB Host controller, although, in different embodiments other software modules, such as the USB Driver, may make the decision as well. Actual use of the device requires additional information from the user of the device to specify the nature and frequency of data transfers (including bandwidth for isochronous transfers) actually intended. It is possible to require additional device specific setup procedures, but these are not a part of the USB specifications, and are treated as being a private matter. Details of the USB specification version 1.1 can be found at www.usb.org/developers/download.htm.

Communications with a device connected to a USB can be viewed as being via a pipe defined by the endpoints available on the device for a particular mode of communication. For instance, a device that sends and receives isochronous data would need at least two isochronous end points, one for sending data and another for receiving data because isochronous data is moved in directional pipes. A given end point has an assigned bandwidth and/or other relevant parameters for isochronous transfers. Thus, a device capable of receiving isochronous data at three bandwidths will support three corresponding endpoints.

USB usually uses drivers to interact with an operating system, in parts to translate operating system queries into commands that the USB hardware can understand. Furthermore, the devices connected to the USB need drivers to interface them to relevant requests and commands from the operating system, which oversees the requests made by users or application programs. Not surprisingly, operating systems are expected to provide drivers, particularly class drivers, for the USB and many of the popular USB compatible devices. This practice enhances system stability and efficiency since the device manufacturers only need supply a mini-driver dealing with the hardware details. On the other hand, in case of operating systems lacking such support third parties may provide the relevant software.

USB specifications require a USB driver to handle I/O Request Packet (IRP). Use of an IRP is a well known, but not the only strategy, for an operating system to facilitate drivers providing services to applications and other software executing on a computer system. In an embodiment described in the instant application, the standardized format offered by IRP and I/O control functions (IOCTL) can be advantageously used to allow addressing drivers, including the USB driver and associated devices drivers. Thus, extending the capabilities of the USB may be efficiently managed by suitably designed interfaces and IRPs to request that USB, and devices connected to the USB, behave in a desired manner.

In addition, some devices connected to the USB may offer additional functionality, which is particularly suited for practicing the instant invention. Such compliant devices would recognize commands to reduce their bandwidth, to describe the various bandwidth modes in which they can operate and may even allow their input and output buffers to be cleared on command. The USB specifications prefer that a USB compatible device respond with a STALL if it receives an invalid request, i.e. a request to which a device cannot respond. To the extent bandwidth can be reduced by changing an interface, USB specifications include SET_INTERFACE in the set of standard device requests. In addition, the standard device requests include GET_CONFIGURATION, SET_CONFIGURATION, GET_INTERFACE, and GET_DESCRIPTOR. Additional "WMI" calls may be used to request a device to change its bandwidth. Moreover, if the call were to be made by a kernel-mode component such as USBD.sys, it would be a callback for which a driver would register.

Some embodiments advantageously use interfaces and procedures provided by an operating system to configure and control USB. Operating Systems that provide support for USB include the "WINDOWS" brand operating systems, which include various releases of "Windows 95", "Windows 98", and "Windows 2000" and future versions, "SOLARIS" operating systems, "IMAC" operating system and many others. Some operating systems, like "LINUX", do not, as of yet, support USB specifications and, thus, an extensive set of drivers may have to be provided in order to implement an embodiment in such operating systems.

One of the embodiments-described herein is based on the "WINDOWS" brand operating systems. However, it should be understood that the scope is not restricted to any particular operating system although different operating systems differ in the ease with which various embodiments can be implemented. As one of ordinary skill in the art will recognize, this does not mean undue experimentation but merely the absence of well known supporting features in some operating systems. Such shortcomings of some operating systems make it more labor intensive to provide functional equivalents of the missing features. The WINDOWS" brand operating systems implement a layered driver architecture with class drivers for well known classes of devices already included in the operating system. This feature is particularly convenient since it requires the device manufacturers to merely supply a mini-driver to allow access to the peculiarities of the hardware implementation. An added benefit is in the increased stability of the operating system. The support available for USB makes these operating systems preferable for many embodiments described herein.

The device drivers, including those for the hubs, are loaded and process requests from the system for services. These requests are usually in the form of (IRPs). An IRP includes, in its data-structure, fields for specifying functions, referred to as minor and major function codes, that need to be performed by one or more devices to facilitate I/O control functions. (IOCTL, a subset of IRPs). In addition, an IRP may also provide pointers to input and output buffers as part of the I/O stack locations in their data-structure.

An IRP is constructed when needed. A given IRP may be passed from one driver to another as needed to allow all of the requested functions to be completed. Each driver in such a sequence has its own I/O stack location. In addition, drivers may create an IRP if needed. Thus, while in principle a driver may be addressed directly, it is usually preferable to use the standardized IRP format to access a driver and services associated with it.

Many embodiments of the invention may use a software module, rebalancing-enabler, and a Policy to make the necessary decisions. The Policy used by a rebalancing-enabler module to make decisions regarding bandwidth allocations tailors the system response to user requests. The default response of the USB, without the benefit of the rebalancing-enabler module, is to deny connection, i.e., bandwidth, to the last device requesting bandwidth. In other words, priority is on a first-come-first-served basis. The Policy generalizes this inflexible response to allow a user or even the operating system to set default preferences. Such preferences may include that the application accessed last by a user has the highest priority in accessing bandwidth resources. Such a Policy should serve to ensure that user frustration is at the minimum. Similarly, applications that have been minimized may have bandwidth allocations retained at a lower priority than applications that are not minimized. And, applications in the foreground may trump requirements of applications in the background.

Other criteria possible would allow bandwidth resources to be allocated, and possibly lost, depending on the frequency. If a monitoring program is accessed frequently then its input resources may retain their bandwidth while devices needed by another program in the background may be reset in times of a bandwidth crunch. In addition, certain configurations of devices may be preferred. Thus, it may be preferable to have both a set of speakers and a video camera functioning, even if at a lower resolution than to have a no win choice between either having sound or picture.

The ability to make such preferences transparently, i.e., without requiring input from the user, is a particularly important benefit made possible in some embodiments. In the rapidly developing Internet environment it is to be expected that a variety of data streams may be accessed via USB devices connected to the Internet or other sources of data. Transparent operation of the rebalancing-enabler module would give effect to user preferences to give an impression of a tunable seamless experience. Thus, the system would automatically focus on the activities of the greatest interest to the user.

This is not to say that user preferences are always well known. In some embodiments it may be possible to input user preferences to be implemented in the Policy by manipulating the Control Panel, in addition to built in defaults. Similarly, other embodiments may allow a device-driver to provide configuration-related Policy requirements for the tasks expected of the corresponding device. The net effect is to create a much more responsive computing environment that is actually user-friendly and enables users to exploit the capabilities of the USB, or another bus, to the fullest extent.

It should be noted that implementing rebalancing-enabler as a user-mode application contributes to system stability because well known mechanisms are used to communicate with the kernel-mode drivers and possible bugs in the user-mode application are less likely to be fatal to the system. Naturally, it is not an absolute requirement that the embodiments be implemented as a user-mode application. Consequently, in some embodiments the Policy may be implemented as a user-mode module while the rebalancer-enabler may be a kernel-mode module that may even be a part of, or closely linked to, the USB system or the host controller driver (HCD).

Figure 2:
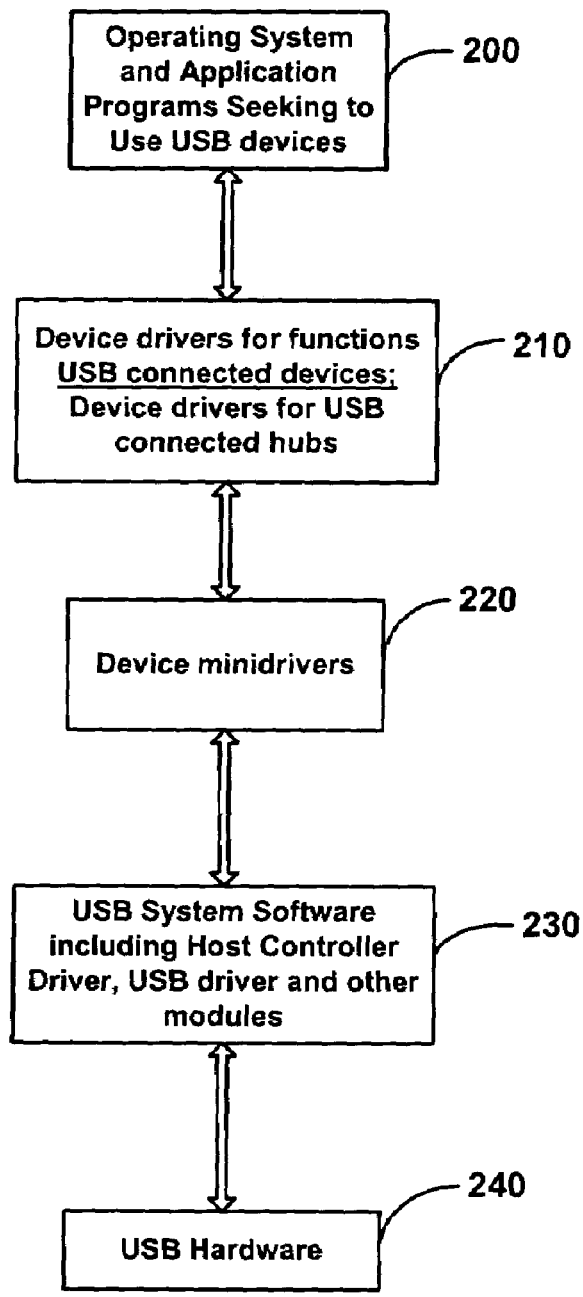
FIG. 2 illustrates a possible USB implementation with a plurality of devices connected to a computer system via the USB Host.

FIG. 2 illustrates a logical high level diagram of exemplary USB system software and device drivers interacting with a computer system. Block 200 illustrates applications requiring input from devices connected via USB or sending output to USB devices or seeking to control/modify USB devices via requests to the operating system components. Blocks 210 and 220 represent the device drivers that actually handle requests directed towards USB devices. Block 210 represents the class drivers while block 220 represents mini-drivers, if any, that are specific for a particular hardware representation. Requests received by the drivers are usually in the form of an IRP, with a function code specifying the nature of action sought. IRPs are usually constructed by operating system components such as I/O control or extensions to the driver management software such as the "WINDOWS" brand operating system anagement Instrumentation ("WMI") as a result of function calls or by drivers and other kernel-mode modules.

Block 230 shows the next stage of IRP processing. The device drivers pass the IRP after performing their share of the tasks to the USB system software, which includes the Host controller driver, the USB driver and an undefined interface between them. This interface is undefined because it is supplied by the specific operating system—and never available directly to the users. Finally, in block 240, the request is actually executed at the hardware level.

Figure 3:
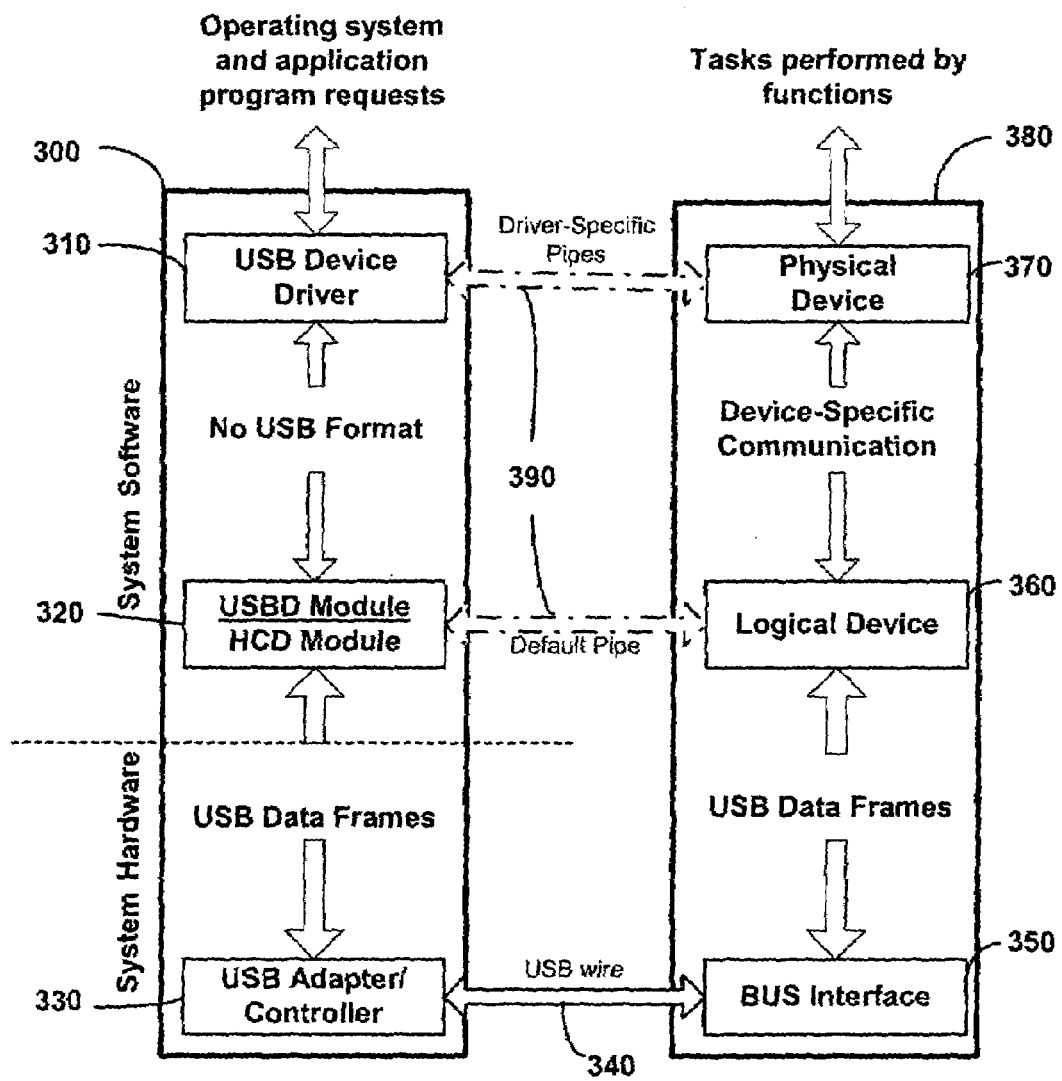
FIG. 3 illustrates a high level representation of the arrangement of drivers for accessing and operating devices connected to a USB.

Another view of data flow and potential bandwidth related decision making is illustrated in FIG. 3. Block 300 includes the USB device drivers 310, USB Driver (USBD) and the Host Controller Driver (HCD) 320, and the USB Adapter/controller 330. USB wire 340 carries the actual signals from the computer (i.e. as provided by the USB Adapter/Controller) to the devices connected to the USB. The signals are received by the USB Bus 380 at a BUS interface 350 and forwarded to the logical device 360, which in turn, sends them on to the actual hardware for performing the requested task, the physical device 370. As would be apparent to one skilled in the art, this is not the only possible topology and other implementations are intended to be within the scope of the invention as well.

It is important to note that to an application accessing the services of a device connected to the USB, the connection is to one of the device specific pipes 390, which is a logical connection.

Figure 4:
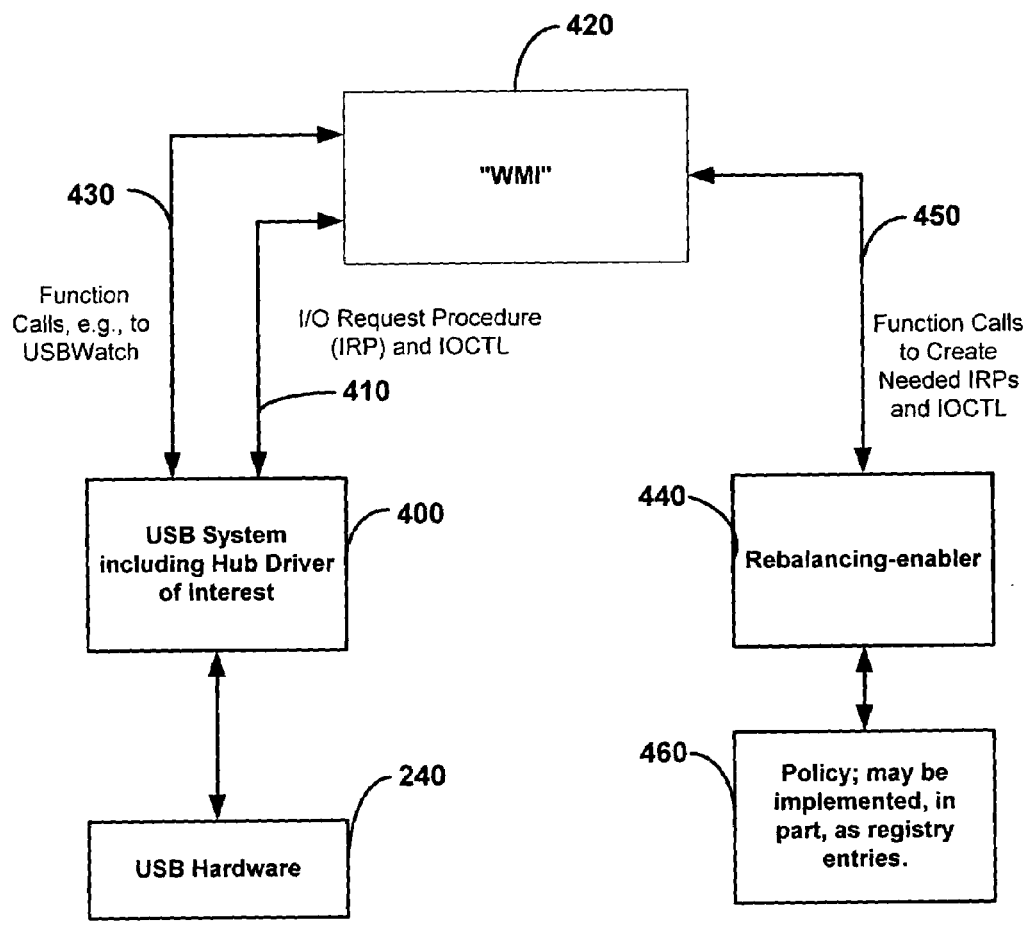
FIG. 4 illustrates a possible high level implementation of the invention illustrating a user-mode to kernel-mode interface.

An overview of an embodiment of the invention, using a rebalancing-enabler software module is illustrated in FIG. 4. This embodiment is implemented in a computer system with a "WINDOWS" brand operating system, in particular with a "WMI" interface. Here, USB hardware 240 is used with the aid of the USB system software 400 in course of handling IRPs 410 created by the "WMI" 420. The USB system block 400, in particular USB hub drivers included therein, can make calls 430 to user-mode applications through "WMI" 420. "WMI" 420 forwards such requests to user-mode applications, e.g., rebalancing-enabler 440, and many user-mode applications, including rebalancing-enabler 440 can make function calls 450 to request services and information from the USB devices through "WMI" 420, which constructs the appropriate IRPs and carries out other relate procedures. In addition, rebalancing-enabler 440 can access resources such as the Policy 460 in course of responding to calls made on it by "WMI" 420. In some embodiments, rebalancer-enabler may be included in the USB system and access the Policy through the registry or a "WMI" interface.

Figure 5:
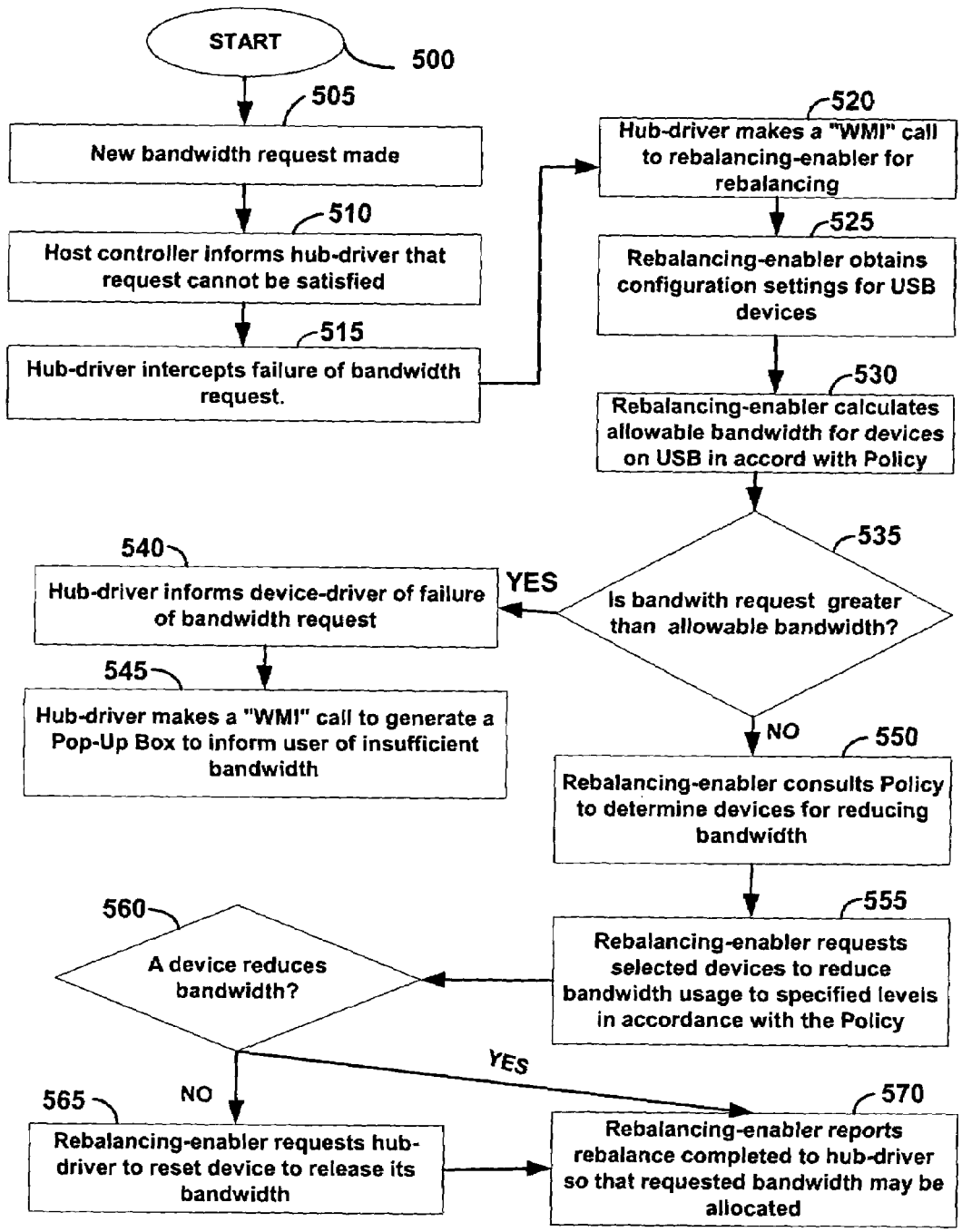
FIG. 5 is a flow chart illustrating some of the steps in allocating Bandwidth in accordance with an embodiment of the invention.

FIG. 5 illustrates a possible, but not the only, decision-making paradigm in accordance with an embodiment of the invention. If a device requiring isochronous bandwidth is connected to the USB, or an application launched that requests isochronous data to and/or from a USB device then an embodiment of the invention may be used starting at step 500. A new bandwidth request 505 is made to the USB system software monitoring bandwidth allocations at the Host. The Host controller informs the requesting hub-driver, controlling the device making the request, that the request cannot be honored at step 510. In the prior art this denial would be forwarded to the device and a silent failure would result. In this embodiment, the hub-driver intercepts this failure to allocate bandwidth at step 515. The hub-driver makes a "WMI" function call to software module rebalancing-enabler to request a rebalancing at step 520. Rebalancing-enabler responds to this request by obtaining the configuration settings corresponding to the devices connected to the USB at step 530. Rebalancing-enabler calculates whether the bandwidth request could be satisfied without violating the Policy at step 535. If it is not possible to accommodate the request by changing bandwidth allocations, it stops and informs the hub-driver that the rebalancing is finished.

Since no bandwidth has been freed, the hub-driver forwards, at step 540, the previously intercepted failure to allocate bandwidth message at step 515. The hub-driver also makes a "WMI" call, at step 545, to generate a pop-up box to inform the user of the failure to use the device as requested due to insufficient bandwidth.

However, if there is a possibility of accommodating a bandwidth request, rebalancing-enabler consults the Policy at step 550 to identify devices for which bandwidth allocations may be reduced. Such reductions may reflect acceptable tradeoffs in resolution or particular configuration preferences and the like as reflected in the Policy. The Policy may be implemented as a database with well-defined defaults, or a simple decision making routine and many variations that are well known to one of ordinary skill in the art. At step 555 rebalancing-enabler requests the devices identified in accordance with the Policy to reduce their bandwidth using the "WMI" interface. Preferably, the new desired bandwidth to be used by the device is explicitly specified.

As may be appreciated, particularly by those of ordinary skill in the art, not all devices may respond to the request to reduce bandwidth due to a variety of reasons. Such reasons may include non-compliance with such requests due to incompatibility with embodiments of the invention, proprietary reasons since the rebalancing-enabler is an extension of, but not in conflict with, the USB specifications. Hence, not all devices, particularly older devices may not be able to respond to such requests.

If a device does not reduce its bandwidth request as determined at step 560, rebalancing-enabler makes a function call using the "WMI" interface to request the hub-driver to reset the device that failed to reduce its bandwidth at step 565. In some embodiments the request to reset the non-responsive device may not be made if the Policy does not allow it. In other embodiments the request to reduce bandwidth may not be made of devices that cannot be reset under the Policy. Such variations would be apparent to one of ordinary skill in the art and are intended to be included in the scope of the claims.

At step 570, when bandwidth has been released due to compliance with the request to reduce bandwidth or due to a device being reset by the hub-driver in accordance with a request by rebalancing-enabler, a rebalance completed message is sent to the relevant hub-driver. The hub-driver requests bandwidth for the device and is able to obtain bandwidth since enough bandwidth has been released as described in the previous steps.

Figure 6:
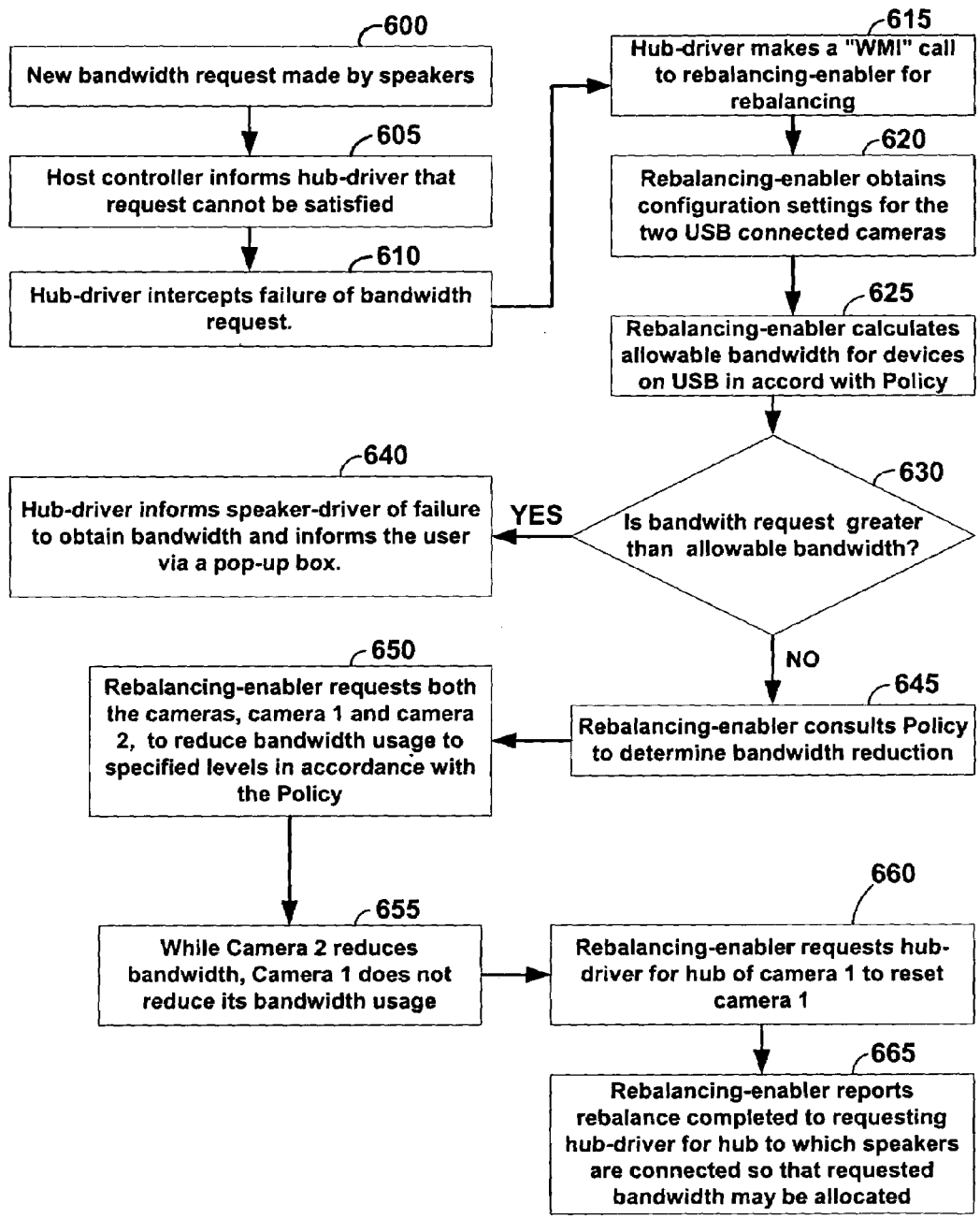
FIG. 6 is a flow chart further illustrating an exemplary implementation in the context of adding a device using the isochronous data transfer mode to a USB.

A more specific example is presented next to illustrate the addition of devices to a USB that is short of bandwidth in FIG. 6. Thus, the addition of another device, a set of speakers 55, shown in FIG. 1, to the USB may result in requiring more bandwidth than the system is capable of providing. In particular, devices like camera-1 53, camera-2, 54, and speakers 55 may use and/or provide serial data in a steady stream in the isochronous mode for transferring data on the USB, as discussed earlier.

In a USB there are drivers corresponding to the devices such as the USB Host controller, the various hubs, not all of which might have the same manufacturer. A high level representation of the decision making system is shown in FIG. 4.

When a USB device is configured, for instance a device that is capable of operating isochronously, i.e., with a constant stream of data of negotiated bandwidth, it may be able to support more than one bandwidth. At a higher bandwidth the sound quality for a speaker system may be superior, or the picture quality for a camera may be less grainy, but the device may function acceptably at lower bandwidths as well.

In the case of USB compatible devices the different modes of data transfer correspond to defined 'endpoints' on the device. For instance, different endpoints are defined by the direction of isochronous data transfer, and the bandwidth used. Thus, a device driver for a device that is connected to the USB and configured accordingly may be able to support a number of endpoints corresponding to different bandwidths. The different alternate settings within an interface contain endpoints that are exposed by the device driver upon approval by the USB system software, which usually communicates with the hub-driver corresponding to the device of interest and manages bandwidth allocation.

If an application is launched that requires the speakers to operate isochronously then a request is sent to the USB system software for an allocation of the necessary bandwidth at step 600 in FIG. 6. This request could be in the form of an IRP to select an interface and configure suitable endpoints. The system software, which includes the Host controller driver, may decide to not provide the bandwidth, e.g., at step 605, because allocating the requested bandwidth would exceed system capacity, hence precluding operation of the speakers. This would be the end of the story under prior art systems and the relevant hub-driver would deny the request making the device inoperative.

One of its embodiments, described here, would allow the relevant hub-driver to intercept the failure of the bandwidth request, as illustrated at step 610, in other words suspend acting on the relevant IRP if the request is in the form of an IRP. Of course, in some embodiments a failure of the bandwidth request need not be explicit and instead a rebalancing event may be generated and handled in a manner analogous to the description in FIG. 6. The hub-driver, instead, at step 615, makes a function call on a user-mode application, named rebalancing-enabler here, although other names could be coined as well, to request a rebalance of the bandwidth allocation to the devices on the USB. An embodiment of the rebalancing-enabler that is preferred is the USBWatch software module compatible with "WINDOWS" brand operating systems. This call is made via a user-mode to kernel-mode interface, "WMI".

Rebalancing-enabler obtains the configuration settings for devices connected to the USB at step 620. Then rebalancing-enabler determines the maximum bandwidth that the requesting device could obtain at step 625 based on the configuration settings for the devices and the Policy. If this bandwidth is less than the requested bandwidth then control is returned to the hub-driver with the rebalancing completed message at step 630. Thus, the final outcome is the same as the prior art in this scenario since the requesting device fails to acquire the requested bandwidth. However, in this case, a pop-up box appears to inform the user that there was insufficient bandwidth to operate the device as requested. Thus, the failure is not mysterious.

In this case, sufficient bandwidth can be released by adjusting the bandwidth settings of other devices so that the requested bandwidth may be supported. At step 635 rebalancing-enabler determines the reductions in bandwidth that should be requested of other devices in order to accommodate the speakers' 55 bandwidth request in accordance with a Policy. This request may, ultimately, be in the form of an IOCTL, resulting in the corresponding device drivers making the alternative interfaces available. In actual practice such a request may comprise more than one instruction. For instance, before another interface, i.e., an endpoint with a different bandwidth, can be made available by a device driver, the data queue for the existing endpoint, for receiving or sending data, should be cleared in keeping with the USB specifications (version 1.1).

It is possible that the device may be unable to accommodate the request and as a consequence not reduce its bandwidth. Rebalancing-enabler may, in accordance with the Policy, decide to request another device to reduce its bandwidth, or to request the hub-driver to reset the device, thus releasing its assigned bandwidth. In order to reset the device a function call is made to "WMI" which communicates with the kernel-mode hub-driver requesting it to reset the particular device connected to a port managed by the hub-driver. If the device being reset, was providing data to an application then the data stream would cease and the application may terminate. Following the request to reset a non-compliant device rebalancing-enabler informs the relevant hub-driver that rebalancing was complete.

At step 640 rebalancing-enabler requests camera-1 53 and camera-2 54 to reduce their bandwidth usage to specified levels. However, while camera-2 54 complies with the request, camera-1 53 does not reduce its bandwidth usage, as depicted at step 645. At step 650, rebalancing-enabler requests the hub-driver corresponding to the hub 49, which controls the port to which camera-1 53 is connected, to reset camera-1 53.

It is possible that the Policy may not permit resetting the device that was requested to reduce its bandwidth in which case either another device is selected in accordance with the Policy for a possible reduction in bandwidth or a rebalancing completed message is returned to the requesting hub-driver. In the example at hand no such strictures prevent camera-1 53 from being reset. Hence, at step 650 the rebalancing-enabler requests that camera-1 53 be reset.

If bandwidth is available as a consequence of the rebalancing operation the requested bandwidth is allocated, else a pop-up box appears to inform the user of the failure to satisfy the request owing to insufficient bandwidth. In some embodiments a pop-up box appears only if there is no attempt to acquire a different alternate setting with lower bandwidth requirements. Of course, the requesting device may try again with a lower amount of bandwidth if the first request did not include such an acceptable amount of bandwidth. Such a new request would start the process all over again.

The specific example in FIG. 6 considered a system with two cameras sending data to a computer system. The computer system then tries to use a speaker to play sounds, which results in a bandwidth request being sent, and which fails.

This failure causes the hub-driver to send the request to the rebalancing-enabler for a re-balance. Rebalancing-enabler consults the Policy and determines that the audio request is in accordance with the Policy but the cameras need to reduce their bandwidth. Rebalancing-enabler, subsequently asks the first video camera to reduce its bandwidth, which is performed. The second video camera, however, fails to reduce its bandwidth since it does not support reducing bandwidth, which is an option rather than a requirement under the USB specification (version 1.1).

Consequently, rebalancing-enabler requests, in accordance with the Policy, to request a resetting of the non-compliant camera. This user-mode request is made by a function call on the "WMI". When this request is successful, rebalancing-enabler concludes that there is enough bandwidth available and sends a "WMI" request to the hub-driver initiating the re-balance request to indicate completion of rebalancing. The hub-driver resends the bandwidth request which, now, succeeds. Finally, the hub-driver passes the successful bandwidth request to the audio driver.

Thus, many embodiments include methods for rebalancing an existing bandwidth allocation to devices connected to a bus. A rebalance is initiated after interception of the failure of a new bandwidth request. The rebalance includes the possibility of requesting devices to switch to a new bandwidth setting based on a pre-established Policy. Furthermore, devices that are unresponsive to such requests, particularly devices that may not recognize such requests as legitimate commands, may be reset in order to release the bandwidth tied up by them. Finally, the method returns a rebalance completed message to release the interception that precipitated the rebalance procedure and allow either an allowance of the requested bandwidth or a denial with an explanatory pop-up box, voice message and the like to indicate that sufficient bandwidth is not available. Therefore, acceptable embodiments are not limited to bandwidth management in the context of USB or FireWire, but instead include a more general strategy to intelligently manage bandwidth allocations.

In a preferred embodiment, a kernel-mode hub-driver makes the request for a rebalance from a user-mode application although it is possible that other kernel-mode modules may make the request instead. An important component of the decision-making process is the Policy which specifies the constraints on the choices that should be made such as last-come-first-served etc. and may identify more than one choice of devices whose bandwidths may be altered. Such an output may be ordered or just a list. The user-mode application carrying out the rebalancing may request information regarding the available configurations of the USB-connected devices. Based on the information obtained by the user-mode application, it may calculate the maximum bandwidth that could be made available to the requesting device in accordance with the Policy. If the requested bandwidth is so large, i.e., greater than the allowable bandwidth, that rebalancing is unlikely to be effective, the rebalancing is terminated and the rebalancing-complete message sent.

It should be noted that although the discussion has focused on the USB based embodiments, it is feasible to practice the invention in the context of the IEEE 1394 serial bus specifications. Unlike the USB system, the IEEE 1394 serial bus does not have hubs, and although it uses the tree architecture, the root of the tree is not necessarily fixed by the physical topology. The relevant details are covered in detail in the specifications and the book, FireWire System Architecture, 2nd Edition, written by Don Anderson and published by MindShare, Inc. (1998)(http://www.mindshare.com/Mindshare/list_of_books.html), which is incorporated herein by reference.

The differences between the IEEE 1394 bus and the USB are not limiting in practicing the methods taught by the invention for making alternative bandwidth allocations, although in a IEEE 1394 serial bus the devices may, additionally, be programmed to directly request bandwidth changes from each other. Such an approach could function independently of an operating system, for instance, by using a bandwidth manager, in a IEEE 1394 bus, undertaking the functions of a rebalancing-enabler, and denying bandwidth to a device that does not reduce its bandwidth. The role of a bandwidth manager may be preferentially be assumed by a suitable device capable of functioning as a rebalancing-enabler. Such a device would include a Policy or may communicate with another device that may provide Policy related information.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of this disclosure. Therefore, this invention contemplates all such embodiments as may come within the scope of the following claims and equivalents thereof.

We claim:

1. A method for rebalancing an existing bandwidth allocation to a plurality of devices connected to a computer system via a bus, the method comprising:

intercepting a failure of a request by a first device to obtain bandwidth;

rebalancing the existing bandwidth allocation to the plurality of devices connected to the bus by requesting that a second device change its bandwidth allocation in accord with a policy, wherein the policy is based, at least in part, on a preference for allocating bandwidth to one device over another, where the preference includes one or more rules selected from a group of rules comprising (1) a rule preferencing a currently running application, (2) a rule preferencing an application running in a foreground, (3) a rule preferencing most recently used application, and (4) a rule preferencing a most frequently running application; and if the second device fails to change its bandwidth allocation, then resetting the second device to release the second device's entire bandwidth allocation.

2. The method of claim 1 where the bus is a Universal Serial Bus (USB).

3. The method of claim 2 wherein a hub driver corresponding to a hub connected to the USB intercepts the failure of the first device's request.

4. The method of claim 2 wherein a host controller intercepts the failure of the first device's request.

5. The method of claim 2 wherein the policy is based, at least in part, on a preference for a latest device connected to the USB.

6. The method of claim 1 where the bus is a "FireWire" bus.

7. The method of claim 1 wherein rebalancing requires no input from a user and is transparent to the user.

8. The method of claim 1 wherein the method is implemented using a user-mode application and a user-mode to kernel-mode interface.

9. The method of claim 8 wherein the interface between the user-mode and the kernel-mode is a "WMI" interface.

10. The method of claim 1 wherein the policy is based, at least in part, on a preference set by a user of the computer system.

11. A computer readable medium having computer-executable instructions for performing a method for rebalancing an existing bandwidth allocation to a plurality of devices connected to a computer system via a bus, the method comprising:

intercepting a failure of a request by a first device to obtain bandwidth;

rebalancing the existing bandwidth allocation to the plurality of devices connected to the bus by requesting that a second device change its bandwidth allocation in accord with a policy, wherein the policy is based, at least in part on a preference for allocating bandwidth to one device over another, where the preference includes one or more rules selected form a group of rules comprising (1) a rule preferencing a currently running application, (2) a rule preferencing an application running in a foreground, (3) a rule preferencing most recently used application, and (4) a rule preferencing a most frequently running application, and if the second device fails to change its bandwidth allocation, then resetting the second device to release the second device's entire bandwidth allocation.

* * * * *